April 24, 1945.　　　M. W. ASKIN　　　2,374,263
CLAMP DEVICES
Filed June 24, 1943　　　4 Sheets-Sheet 1

INVENTOR.
MORRIS W. ASKIN
BY
ATTORNEY

April 24, 1945.                M. W. ASKIN                 2,374,263
                              CLAMP DEVICES
                          Filed June 24, 1943           4 Sheets-Sheet 2
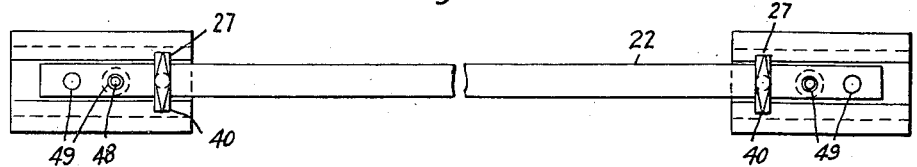
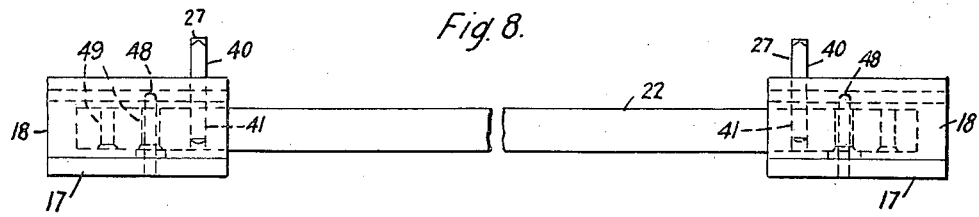
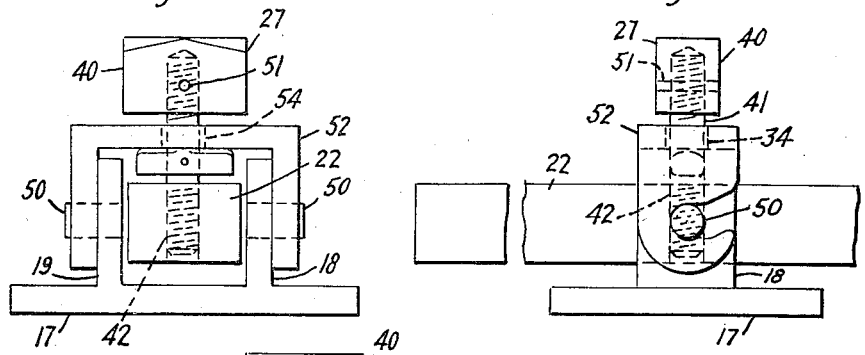
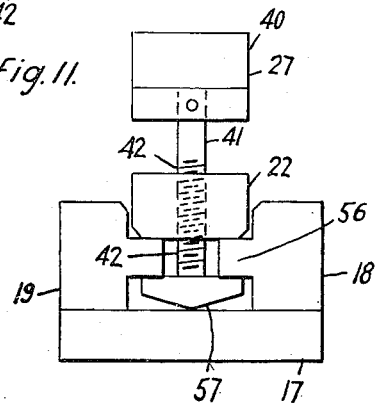
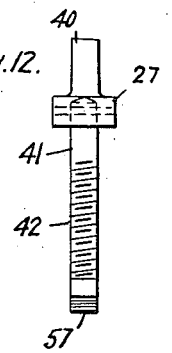
INVENTOR.
MORRIS W. ASKIN
BY
ATTORNEY

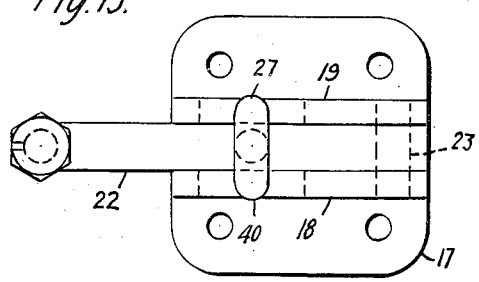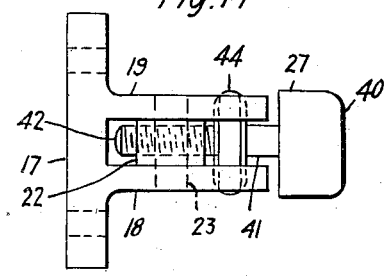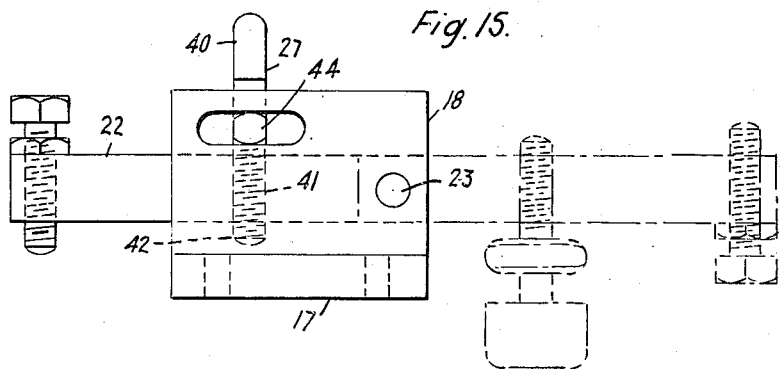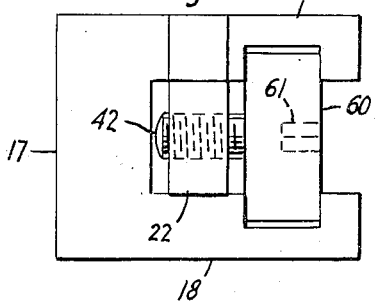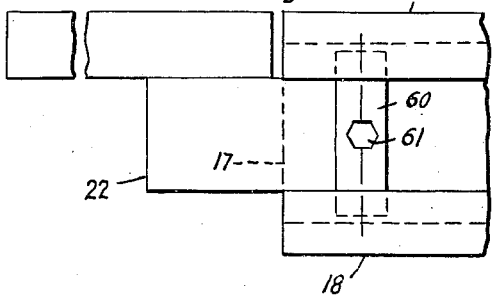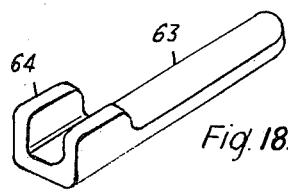

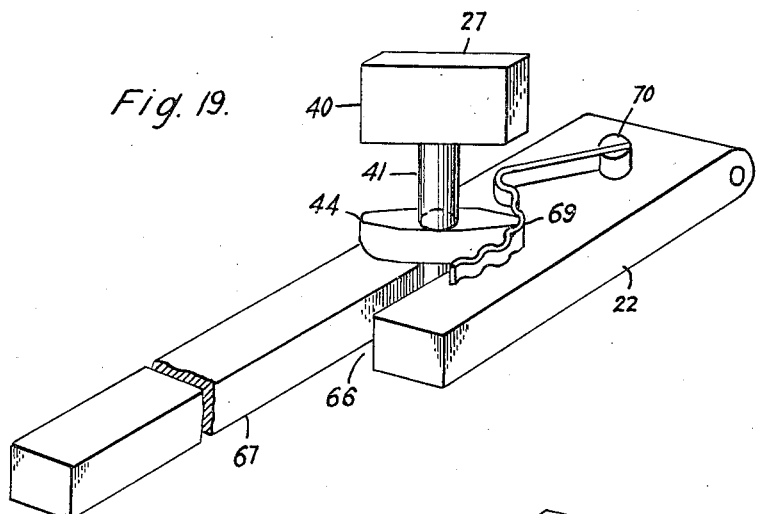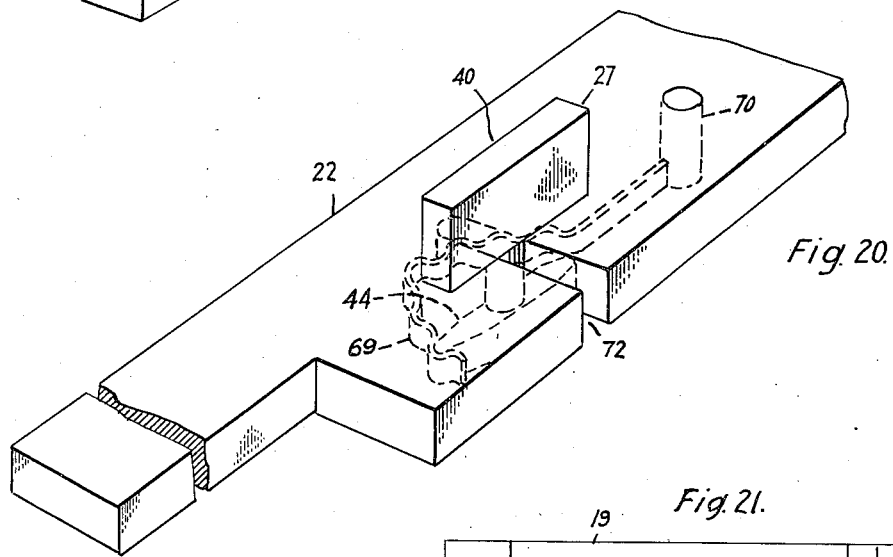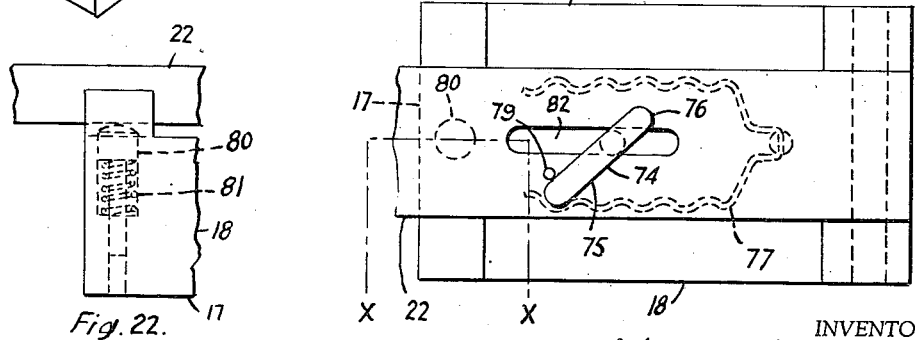

Patented Apr. 24, 1945

2,374,263

UNITED STATES PATENT OFFICE 2,374,263

CLAMP DEVICE

Morris W. Askin, Philadelphia, Pa.

Application June 24, 1943, Serial No. 492,096

10 Claims. (Cl. 29—284)

My invention relates to clamp devices, and particularly to devices of such character adapted for rapid and frequent operation.

In high production service, as in aircraft and other manufacture, devices of the above-indicated character prior to my invention have been subject to various faults, such that they are unduly complicated and expensive, are difficult to manipulate, embody an undue number of levers and other parts, are not certain in positioning or retentive ability, have dead points or centers before beginning the clamping action, require special adjustment, are subject to excessive wear, obstruct the process with which they are associated, embody or control parts which stick or freeze to each other or are not capable of releasing such parts, are not readily mountable or reclaimable, are slow in operation, embody latch pins that are loose or hang on chains and are of troublesome manipulation, subject to loss or tangling with the chains, are weak bodily or in parts and not manufacturable or repairable readily or with simple materials, are dangerous to the operators, are not easily modified or adapted to different conditions of space or service, and are further ineffective.

An object of my invention is to provide novel clamp means that shall be free from certain, and less subject to other, of the above-mentioned faults, and that shall be an improvement generally in the arts to which it relates.

Another object of the invention is to provide a clamp device which may be easily manipulated by comparatively unskilled operators and not merely by experts in the usual sense.

Another object of the invention is to provide a device of the above-indicated character in which the force applied to an object being clamped, instead of being less than the force applied by the clamp operating member, shall be expanded or increased relative to the applied force of such member.

Another object of my invention is to provide a device in which a device somewhat similar to a usual quarter turn screw shall have several further effective positions or greater degree of turn, and in which it may be releasably held for intentional, but prevented from accidental, release.

Another object of the invention is to provide a clamp device which may act by the usual impingement against an object being held, or be adapted to hold an object before, during and after the clamping or holding action, whereby objects being held at a distance from the operator may be transmitted by the clamp to clamping position and released for clamping, or returned to the operator by the clamp during the releasing operation.

Another object of the invention is to provide a clamp device in which a member or arm movable relative to a base may be either permanently attached or pivoted to the base, or separably related thereto whereby in the latter case, when operating over long distances, the movable member will not be required to travel in an arc, to be interfered with by surrounding structure, but may be thrust lengthwise to position through small or crowded space and secured to the base.

Another object of the invention is to provide for the employment of two or more bases relative to which the movable member or members may be operated with like facility.

With such objects in view, as well as other advantages which may be incident to a utilization of the improvements, the invention comprises the parts and combinations thereof hereinafter set forth in the drawings, specification and claims, with the understanding that the several necessary elements constituting the same may be varied in proportion, arrangement and texture, without departing from the nature and scope of the invention.

In practicing the invention in one form, employing base and operating members or arms movable relative to each other along a given path, and one thereof having locking means extending transversely to such path, an element on the other may take the form of a quarter turn screw or the like, except that instead of effecting its clamping action with the bottom of its head, it effects such action with the top of its head or with means on a shank spaced from the head, which cooperates with the aforesaid transversely extending locking means to effect novel function and results, as will more fully appear herein.

The normally movable clamping member may be pivoted to the base for distances of short arc throw, or separably associated therewith, as above mentioned, for distances of short or long throw, and adapted for cooperation with a similar base or other means at the other end or intermediate point, whereby it is contemplated to provide means at one or more places to prevent longitudinal movement of the clamp member or arm.

The arrangement of the partial turn screw or its equivalent may be such that, in effecting the releasing action, it may be caused to act against the base or other member to break any sticking or freezing effect opposing its release, whereby to overcome an objection quite common in former clamping apparatus.

To make the invention more readily understood, means are shown in the accompanying drawings for carrying the same into practical effect, without limiting the improvements in the useful applications thereof to the particular constructions which, for the purpose of explanation, are made the subject of illustration.

In the drawings:

Fig. 7 is a top plan view of the invention in another modification thereof;

Fig. 8 is a view, in side elevation, of the device of Fig. 7;

Fig. 9 is a view, in end elevation, of the invention in another modified form;

Fig. 10 is a view, in side elevation, of the device of Fig. 9;

Fig. 11 is a view, in end elevation, of another modification of the invention;

Fig. 12 is a detail view in side elevation, of an element of Fig. 11;

Fig. 13 is a top plan view of structure embodying another modification of the invention;

Fig. 14 is a view, in end elevation, of the device of Fig. 13;

Fig. 15 is a side elevation of the structure of Figs. 13 and 14, showing also, in broken lines, the positions of parts in the open condition of the clamp;

Fig. 16 is a view, in front elevation, of the invention in another modified form;

Fig. 17 is a side elevation of the structure of Fig. 16;

Fig. 18 is a perspective view of a wrench for operating the device of Figs. 16 and 17;

Fig. 19 is a view, in perspective, of a portion of a device conforming to another modification of the invention;

Fig. 20 is a view similar to Fig. 19 of another form of the invention;

Fig. 21 is a view, in top plan or elevation, of the invention in further modified form; and Fig. 22 is a view of a portion of the device of Fig. 21.

In all of the figures, corresponding parts are designated by corresponding reference characters, and are severally of metal, fiber composition or other material according to desire, circumstances or special conditions.

Figure 1:
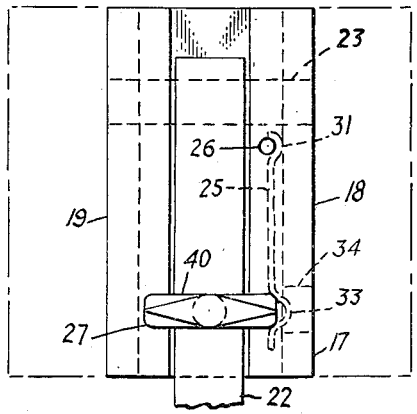
Figure 1 is a top plan view of a device embodying my invention in one form.
Figure 2:
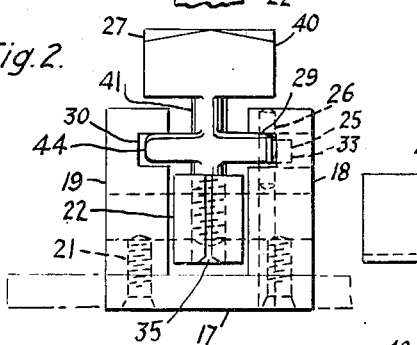
Fig. 2 is a view, in front elevation, of the device of Fig. 1.
Figure 3:
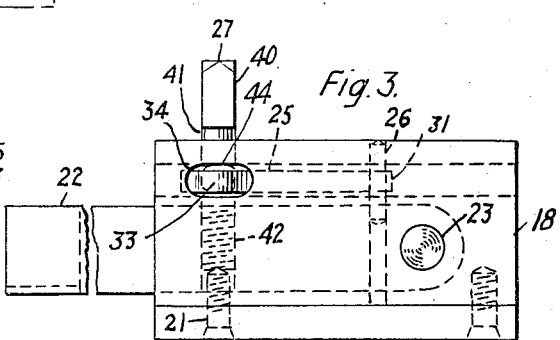
Fig. 3 is a view, in side elevation, of the structure of Figs. 1 and 2.

Referring particularly to Figs. 1 to 3, inclusive, the device comprises a base plate 17, side plates 18 and 19, elements, such as dowels or screws 21 for holding the base and side plates together, an arm 22, a hinge pin 23 by which the arm 22 is pivoted to the side plates 18 and 19, a spring 25, a pin 26 press fitted into the side wall 18 for holding the spring 25 in position, and an operating member 27 constituting an important element of the invention, carried by the arm 22.

The base plate 17, for certain applications, may be merely as wide as the clamp body, as illustrated by full lines, or adapted to other conditions by being wider, as indicated by dot and dash lines.

The side plates 18 and 19 are similarly provided with upper inside grooves 29 and 30, respectively, of rectangular cross section extending in this case throughout the length of the plates, although they may be of other locations, sections and length.

The spring 25 has a bent portion 31 whereby it is interlocked between the pin 26 and the side plate 18, and another bent portion 33 located opposite, or partially in, an aperture 34 in the side plate 18.

The hinge pin 23 may be press fitted to the arm 22 and slip fitted in the side plates 18 and 19, or slip fitted in the arm 22 and press fitted to the plates, in either case, the slip fit bearing being as stated or provided with bushing means.

Figure 4:
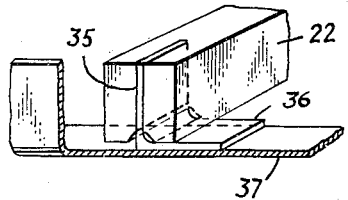
Fig. 4 is a detail perspective view of a portion of the device of the previous figures, showing work objects associated therewith.

A slot 35, chamfered at its lower end as desired, may be provided in the free end of the arm 22 for holding, as illustrated in Fig. 4, an object, such as an extruded angle member 36 as for spot or other welding to an angle 37, or for simultaneous drilling therewith for the reception of rivets or other elements.

The slot 35 is merely illustrative of one of various means for releasably or otherwise holding a work object, whereby it may be placed in the arm 22 in an open position of the latter for transmission to the welding or other working position, this feature being of advantage especially in relatively inaccessible or distant positions of the object from the clamp body.

In the welding illustration above, the arm 22 releases from the angle 36 when the arm is opened from near its pivot end, the reason for this feature being more apparent by considering it with respect to the longer arms shown in other of the figures.

When the angle 36 is merely drilled with the angle 37 for later attachment thereto, as by riveting, the angle 36 will be returned to the operator upon opening the clamp.

The operating member 27 comprises a head 40, a shank 41 having a screw threaded lower portion 42, and an intermediate cross piece 44, in this case near the head 40.

Instead of utilizing the underside of the head 40 as the clamping portion, as in ordinary quarter turn screw means, the device, according to my invention, effects its clamping at the upper side of the head, as will later appear, or at the upper side of the cross piece 44, by engagement of this piece with underside portions of the side plates 18 and 19 above the grooves 29 and 30, the head 40 not being employed, in this instance, for direct clamping purposes.

Another distinction of the device over quarter turn screw devices of ordinary use, is that the member 27 is, in this instance, carried by the movable element or arm 22, whereas the ordinary screw is mounted on a base for cooperation with an arm.

Further, the usual screw normally cooperates with the arm at the free end of the latter, whereas the member 27 is adapted for use near the pivot end of the arm, thus adding further to the functional improvement and advantage of the invention.

In operation, with the cross piece 44 parallel to the slot formed between the side plates 18 and 19, the arm is inserted between the plates, and the member 27 turned to the position shown, in which the top side of the cross piece engages the top sides of the grooves 29 and 30.

The spring 25 serves as a slip detent to assist in holding the member 27 in position against accidental turning, but provides for its ready intentional turning for release.

During the turning of the member 27 in the opposite direction between released and locked position, it flexes the spring 25, in this instance, such that the bend 33 moves in the aperture 34.

The clamp, of course, is intended for use as an ordinary clamp in the sense that the feature illustrated by the slot 35 and its equivalent, need not necessarily be employed in every case.

Figure 5:
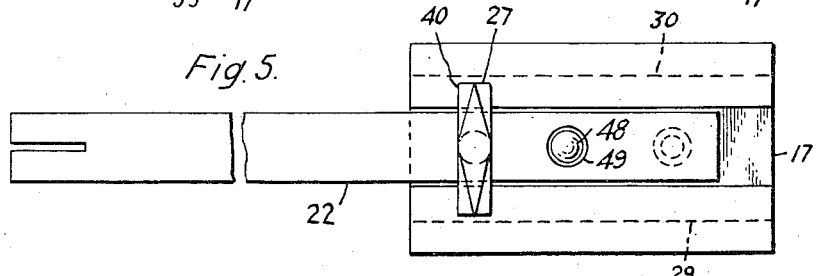
Fig. 5 is a top plan view of the invention in modified form.
Figure 6:
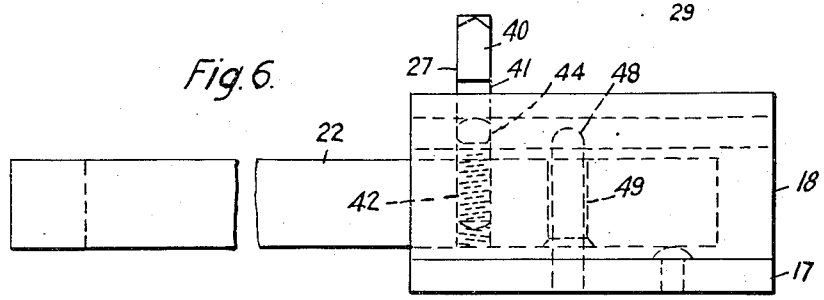
Fig. 6 is a view, in side elevation, of the structure of Fig. 5.

Referring to Figs. 5 and 6, the construction and operation are similar to those above described, except that, instead of the arm 22 being pivoted to the base by the pin 23, it is mounted for ready separation from the base, and held against longitudinal movement relative thereto, as by a pin 48 secured to the base plate 17. The arm 22, in this case, has an aperture 49 by which it is fitted over the pin 48. Thus, where the arm 22 is long, it may be thrust through crowded or difficult spaces, not accessible to a pivoted arm, and just as effectively clamped as in the form of the invention of Figs. 1 to 4 by pivotal action, as on the head of a screw or pin in the plate 17 shown in dotted lines to the right of the pin 48.

The latter condition is better seen in the form of the invention illustrated in Figs. 7 and 8, which also designates the further feature of having two of the clamp bodies and only one clamp arm.

In Figs. 9 and 10, the base and side plates are indicated as one integral piece and, instead of having the grooves 29 and 30, above set forth, are provided with trunnion like members 50.

The member 27 has its head and shank elements 40 and 41 constructed as separate pieces screw threaded to each other and locked, as by a pin 51. This construction provides for the reception, between the head 40 and the cross piece 44, of a member 52 of inverted substantially U-section having an aperture 54 by which it surrounds the shank 40 and is retained in position by the head and the cross piece.

The arms of the member 52 are of hook-like form for interlocking relation to the trunnions 50, this construction taking the place of the grooves of the above-described structures.

In Figs. 11 and 12, the grooves are replaced by shoulders 56, and the member 27 has the additional feature of a portion 57 for engagement with the bottom plate 17. With this arrangement, where for any cause, the arm 22 becames locked or frozen in position independently of the locking member 27, a preliminary turning of the latter may be caused to force the same downwardly against the plate 17, with the resultant lifting of the arm 22 tending to break its independent frozen or stuck condition.

Where the screw threaded portion 42 of the shank 41 has a left handed screw, the abovementioned action is effected by a right hand turn of the member 27 and, conversely, where the thread is right hand, the action is effected by turning the member 27 left handwise.

Figs. 13, 14 and 15 illustrate the feature of the invention whereby the clamp occupies reduced head room, with the member 27 shown low in both the open and closed positions of the clamp. This feature distinguishes the invention materially from former clamps most of which, and particularly certain of those more widely employed, occupy excessive head room in one or both of their open and closed positions.

In Figs. 16 and 17, the invention is adapted to extremely small spaces by eliminating the protruding head 40 of the above-described structures, and substituting a head or cross piece 60 submerged beneath the body top and having a socket opening 61 for the reception of a socket head screw wrench.

As shown in Fig. 18, a wrench 63 has portions 64 for slip fitting the sides of the head 60 of Figs. 16 and 17. The wrench arrangement also lends a certain degree of protection against accidental or unauthorized operation of the clamp.

In the form of the invention illustrated in Fig. 19, the clamp arm 22 has an open longitudinal slot 66, and an extension 67 at one side of the slot.

The operating member 27 is similar to the operating member 27 of Figs. 1 to 3, but, instead of being mounted on the movable arm, is adapted for mounting on the stationary base (not shown) for action on the arm similarly to a quarter turn screw, except for the greater turning movement of the present device.

Also, in this instance, the cross piece 44, instead of utilizing its top surface for clamping, employs its under surface and acts further in the novel capacity of detent coacting with an accentuating means, such as a convolute spring 69 secured to the arm, as by a pin 70. The spring 69 operates to releasably hold the operating member 27 in any one of several positions.

In Fig. 20, the structure is generally similar to the structure of Fig. 19, except that the head 40 does the clamping, the cross piece 44, the spring 69 and the pin 70 are beneath the arm 22, and a slot 72 in the arm extends crosswise of the latter. In such arrangement, the clamp position of the head 40 is parallel to the arm to better distribute the clamping forces along the arm.

In Fig. 21, an operating member 74 has its cross piece and head each or severally made up of long and short arms 75 and 76, respectively, in which the long arm cooperates with a spring 77 to be releasably held thereby in any one of several positions throughout an almost complete revolution of the operating member.

A pin 79 prevents operative turning of the operating member in the counterclockwise direction, as viewed in the drawings, and compels its operation clockwise so that it may have the greater turning movement mentioned.

Fig. 22 better illustrates another feature of the device of Fig. 21, in which a plunger 80 operates between a spring 81 and the arm 22 to act both as a cushion for the arm and as means for assisting the opening of the arm where difficulty of opening the arm, caused by freezing or other factor, is encountered.

In Fig. 21, because of the relation of a slot 82 in the arm 22 to the arms 75 and 76, the arm cannot be moved to clamping position relative to the base, unless the long arm 75 is parallel to the slot and to the left, as seen in the drawings.

In such position, the arm 75 cannot be turned an effective distance counterclockwise, because of the pin 79. However, the operating member may be turned in the clockwise direction any distance until it engages the pin 79, and be accentuated in position by the spring 77.

Also, although the head may have equal arms, by providing it with long and short arms, the same or similar to the cross piece beneath the arm 22, it acts as an indicator for the position of the cross piece.

With the spring at the top of the arm 22, for direct coaction with the head, the latter may be of unequal arm character, as above set forth, at the bottom for engaging the spring as stated, and of unequal arm character at the top, or of equal arm construction at the top merging into the unequal arms at the bottom in the form of a sloping edge indicator or the like for indicating the position of the operating member as stated in connection with the construction having the unequal arm head and cross piece.

I claim as my invention:

1. A clamp comprising a base embodying a channel-like portion presenting a bottom and sides, an elongated arm having an inner length for movement into and out of said channel parallel thereto, and an outer length for clamping an object, means pivotally connecting the inner end of said inner length to said base, said sides having shoulders extending laterally to the path of movement of said arm and disposed aside said path, the arm having a screw threaded portion, and a screw carried by said screw threaded arm portion having laterally extending shoulders and operative by screw turning movement of partial revolution for turning the arm shoulders from positions parallel to the channel to locking positions relative to said side shoulders preventing opening of the clamp and effecting clamping action of said outer end arm length against said object.

2. A clamp comprising a base embodying a channel-like portion presenting a bottom and sides, an elongated arm having an inner length for movement into and out of said channel parallel thereto, and an outer length for clamping an object, means pivotally connecting the inner end of said inner length to said base, said sides having shoulders extending laterally to the path of movement of said arm and disposed aside said path, the arm having a screw threaded portion, and a screw carried by said screw threaded arm portion extending therethrough having its inner end for coaction with the bottom of the channel for lifting the arm relative to the base and having laterally extending shoulders and operative by screw turning movement of partial revolution for turning the arm shoulders from positions parallel to the channel to locking positions relative to said side shoulders preventing opening of the clamp and effecting clamping action of said outer end arm length against said object.

3. A work object holding clamp comprising a base having shoulder means, an arm movably mounted relative to the base and having a screw threaded portion, said base shoulder means being disposed laterally of the path of movement of said arm, and a screw carried by said screw threaded arm portion in screw threaded cooperation therewith embodying shoulder means and having screw action for effecting both the actions of positioning said screw shoulder means in locking relation to said base shoulder means to clamp said object by force exerted between said base and screw shoulder means and moving said screw shoulder means out of clamping relation to said base shoulder means for releasing said arm.

4. A clamp comprising a base having a shoulder, an arm movably mounted relative to the base and having a screw threaded portion, and a screw carried by said arm in screw threaded cooperation with said screw threaded arm portion embodying a shoulder and having screw action for effecting both the actions of positioning said arm shoulder in locking relation to said base shoulder and clamping said object by force exerted between said base and screw shoulders, said screw also having a portion responsive to turning of the screw for cooperation with the base to effect a release action of the arm relative to the base by force exerted through the screw between the arm and the base adjacent to said base shoulder.

5. A clamp comprising a base having a shoulder, an arm for movement relative to the base between released position and a position adjacent to a clamping locking position and having a screw threaded portion, and a screw carried by said screw threaded arm portion embodying a shoulder and having a single screw action in said adjacent position for effecting both the actions of positioning said screw shoulder in locking relation to said base shoulder and clamping said object by force exerted between the shoulders, said screw also having a portion responsive to turning of the screw for engaging the base to effect a releasing action of the arm relative to the base independently of said first movement.

6. A clamp comprising a base having shoulder means, an arm having an inner end portion for pivotal coaction with the base and an outer end portion for clamping an object, the shoulder means on said base extending laterally to said arm aside the path of movement thereof, the arm having a screw threaded portion, and a screw carried by said screw threaded arm portion having an outer end handle and laterally extending shoulder means spaced from the handle and operative by screw turning movement for turning the screw shoulder means from position parallel to the arm to locking position relative to said base shoulder means preventing opening of the clamp and effecting clamping action of said outer end arm portion against said object.

7. A work object holding clamp comprising a base, an elongated arm having an inner end portion for pivotal coaction with the base and an outer end portion for clamping said object, shoulder means on said base extending laterally to said arm aside the path of movement thereof, the arm having a screw threaded portion, and a screw carried by said screw threaded arm portion having an outer end providing laterally extending shoulder means and operative by screw turning movement for turning the screw shoulder means from position parallel to the arm to locking position relative to said base shoulder means preventing opening of the clamp and effecting clamping action of said outer end arm portion against said object.

8. A work object holding clamp comprising a base, an elongated arm having an inner end portion for pivotal coaction with the base and an outer end portion for clamping action against said object, shoulder means on said base extending laterally to said arm at one side of the path of movement thereof, the arm having a screw threaded portion intermediate said ends, and a screw carried by said arm in screw threaded cooperation with said screw threaded arm portion, said screw having laterally extending shoulder means and operative by screw turning movement for turning the screw shoulder means from position parallel to the arm whereby it may pass said base shoulder means to locking position under said base shoulder means preventing opening of the clamp and effecting clamping action of said outer end arm portion against said object.

9. A work object holding clamp comprising a base member, an elongated arm member having an inner end portion for pivotal coaction with the base member and an outer end portion for clamping coaction against said object, shoulder means on one of said members, the other of said members having a screw threaded portion intermediate said ends, and a screw in screw threaded cooperation with said threaded portion, said screw having laterally extending shoulder means and operative by screw turning movement for turning the screw shoulder means from position whereby it may pass said first shoulder means to locking position relative to said first shoulder means preventing opening of the clamp and effecting clamping action of said outer end arm portion against said object.

10. A work object holding clamp comprising a base member, an elongated arm member having an inner end portion for pivotal coaction with the base member and an outer end portion for clamping coaction against said object, shoulder means on one of said members, the other of said members having a screw threaded portion intermediate said ends, a screw in screw threaded co-operation with said threaded portion, said screw having laterally extending shoulder means and operative by screw turning movement for turning the screw shoulder means from position whereby it may pass said first shoulder means to locking position relative to said first shoulder means preventing opening of the clamp and effecting clamping action of said outer end arm portion against said object, and stop means for preventing turning of said screw in one direction from said first position and limiting turning of the screw in the opposite direction from said first position in said locking position.

MORRIS W. ASKIN.